C. GILBERT.
FENDER.
APPLICATION FILED JAN. 4, 1915.
1,174,709.
Patented Mar. 7, 1916.
2 SHEETS—SHEET 1.
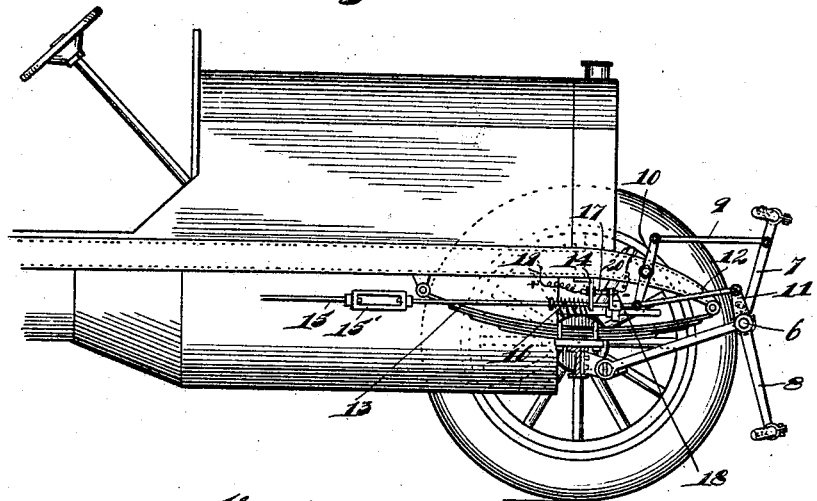
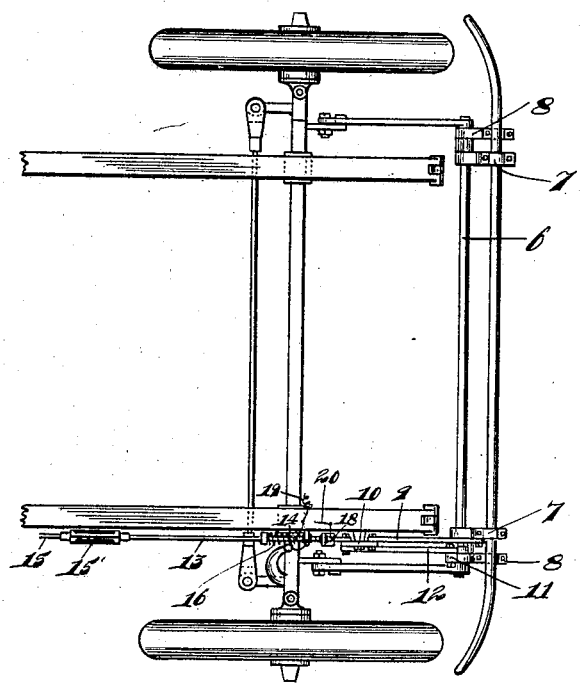

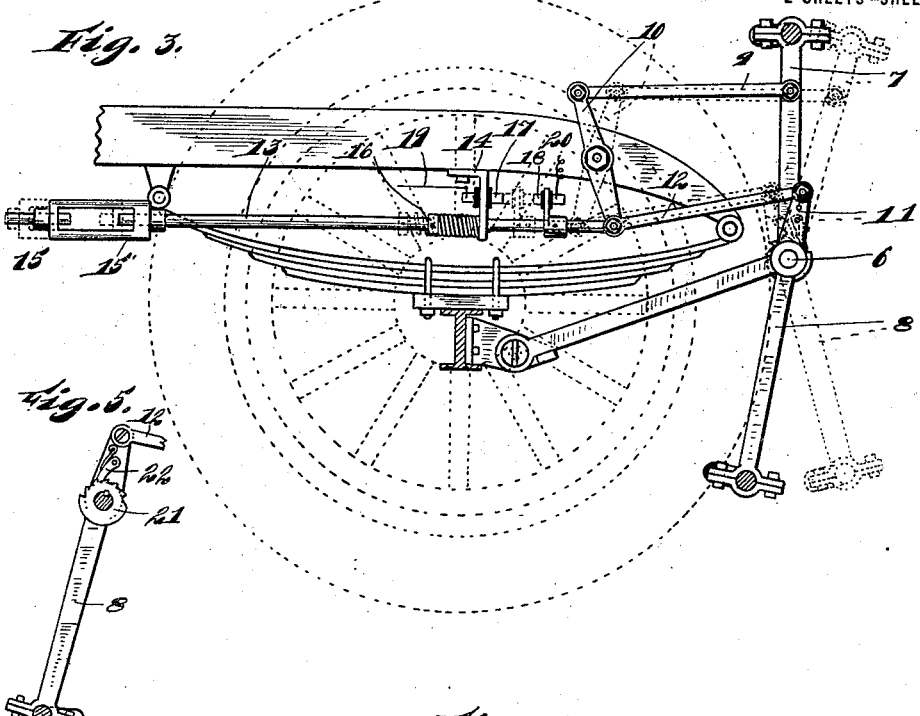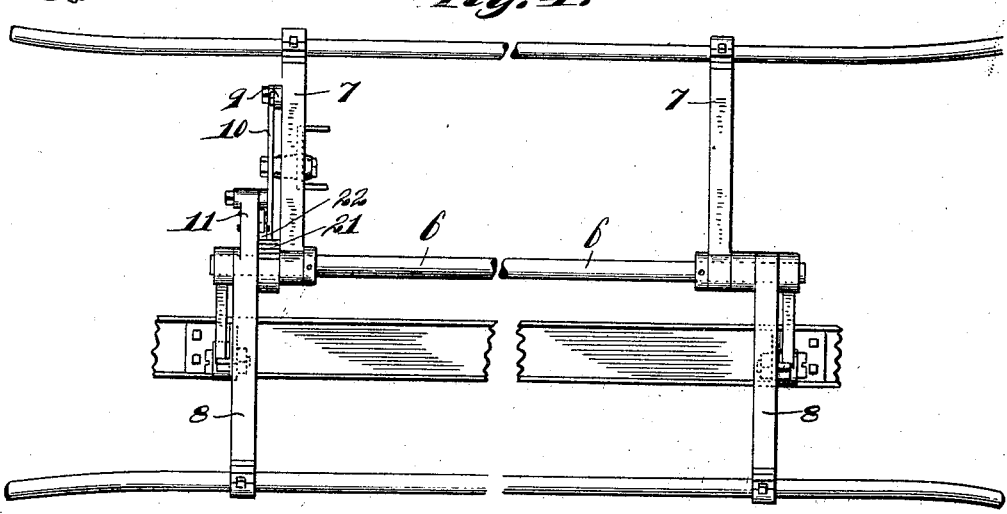

UNITED STATES PATENT OFFICE.

CHARLES GILBERT, OF CHICAGO, ILLINOIS.

FENDER.

1,174,709.   Specification of Letters Patent.   Patented Mar. 7, 1916.

Application filed January 4, 1915.   Serial No. 413.

*To all whom it may concern:*

Be it known that I, CHARLES GILBERT, a citizen of the United States, and a resident of the city or Chicago, county of Cook, and State of Illinois, have invented certain new and useful Improvements in Fenders, of which the following is a specification.

My invention relates to improvements in fenders especially adapted for use on automobiles, and has for its object the provision of an improved construction of this character for automatically stopping the vehicle in case of a collision.

The invention consists in the combinations and arrangements of parts hereinafter described and claimed.

The invention will be best understood by reference to the accompanying drawings forming a part of this specification, and in which, Figure 1 is a side view with portions removed of the forward portion of an automobile equipped with means embodying my invention, Fig. 2, a top plan view of the same, Fig. 3, an enlarged view similar to the forward portion of Fig. 1, Fig. 4, a front view corresponding with Fig. 3, and Fig. 5, a detail view of means employed for automatically locking the fender frames in rearward positions.

The preferred form of construction as illustrated in the drawings comprises a supporting rod or bar 6 suitably secured at the front of the vehicle. An upwardly extending fender frame 7 and a downwardly extending fender frame 8 are pivotally mounted on bar 6 to swing freely thereon. Fender frame 7 is connected by means of a link 9 with the upper arm of a lever 10 pivoted centrally on the frame of the automobile, as shown. Fender frame 8 is provided with an arm extending upwardly from bar 6 and connected by means of a link 12 with the lower end of lever 10. The lower end of lever 10 is also connected with a rod 13 slidable in a guide 14 and connected at its rear end with the ordinary brake rod 15 of the vehicle by means of a turn-buckle 15'. Rod 13 is normally held in rearward position by means of a compression spring 16, as indicated. By this arrangement, it will be observed that, the fender frames 7 and 8 will be normally held in the full line position indicated in Fig. 1, but will swing rearwardly to the full line position indicated in Fig. 3, upon a collision with a person or other object.

An electric contact 17 is secured to the bracket 14 being insulated therefrom, and a coöperating electric contact 18 is secured to rod 13, being also insulated therefrom. Contacts 17 and 18 are connected by means of wires 19 and 20 in series in the ignition circuit of the motor of the automobile, so that when rod 13 is drawn forwardly, said ignition circuit is broken. A ratchet wheel 21 is rigidly secured to bar 6 and a coöperating spring held pawl 22 is mounted upon arm 11, so that when either of the fender frames 7 or 8 is struck, both fender frames swing rearwardly and are automatically locked in rearward position so that the operator has to dismount from the automobile to release them. This rearward swinging of the fender frames automatically operates the brake rod 15 to release the clutch and apply the brakes of the automobile, and at the same time to break the ignition circuit of the motor, thus effectually stopping the automobile and preventing restarting of the same until the operator has released the fender frames. This arrangement tends to lessen the severity of accidents due to collisions, and also the escape of an offending operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with an internal combustion motor driven vehicle having a brake rod, of a supporting bar arranged at the front of said vehicle; two rearwardly yieldable fender frames pivoted to said supporting bar, one of said frames extending upwardly from said bar and the other downwardly therefrom; a lever pivoted centrally to the frame of the vehicle; a link connecting the upper end of said lever with the upper fender frame; an arm extending upwardly from the lower frame above said supporting bar; a link connecting the upper end of said arm with the lower end of said lever; a slidable spring held rod connecting the lower end of said lever with the brake rod of the vehicle; an electric contact mounted on the frame of the vehicle; an electric contact mounted on said slidable rod and coöperating with said first mentioned contact; and wires connecting said contacts in series with the ignition circuit of the internal combustion motor, substantially as described.

2. The combination with a motor driven vehicle, of an upwardly extending rearwardly yieldable fender frame pivoted at its lower end to the front thereof; and a coöperating downwardly extending simultaneously rearwardly yieldable fender frame pivoted at its upper end, substantially as described.

3. The combination with a motor driven vehicle, of an upwardly extending rearwardly yieldable fender frame pivoted at its lower end to the front thereof; a coöperating downwardly extending rearwardly yieldable fender frame pivoted at its upper end; and an operative connection between said fender frames compelling simultaneous rearward movements thereof, substantially as described.

4. The combination with a motor driven vehicle, of a supporting bar arranged at the front thereof; an upwardly extending rearwardly yieldable fender frame pivoted at its lower end on said supporting bar; a coöperating downwardly extending rearwardly yieldable fender frame pivoted at its upper end on said bar; and an operative connection between said fender frames compelling simultaneous rearward movements thereof, substantially as described.

5. The combination with a motor driven vehicle, of a supporting bar arranged at the front thereof: an upwardly extending rearwardly yieldable fender frame pivoted at its lower end on said supporting bar; a coöperating downwardly extending rearwardly yieldable fender frame pivoted at its upper end on said bar; an operative connection between said fender frames compelling simultaneous rearward movements thereof: a brake rod; an operative connection between said fender frames and said brake rod; an ignition circuit; and an operative connection between said ignition circuit and said fender frames, substantially as described.

In testimony whereof I have signed my name to this specification in the presence of two subscribing witnesses.

CHARLES GILBERT.

Witnesses:
JOSHUA R. H. POTTS,
HELEN F. LILLIS.